United States Patent [19]

Morimoto

[11] Patent Number: 4,615,581
[45] Date of Patent: Oct. 7, 1986

[54] OPTICAL FIBER CONNECTOR
[75] Inventor: Yoshitaka Morimoto, Tokyo, Japan
[73] Assignee: Nippon Electric Co., Ltd., Tokyo, Japan
[21] Appl. No.: 472,306
[22] Filed: Mar. 4, 1983
[30] Foreign Application Priority Data
  Mar. 5, 1982 [JP] Japan .................. 57-34705
[51] Int. Cl.$^4$ .................... G02B 6/36; G02B 6/38
[52] U.S. Cl. .................. 350/96.21; 350/96.20; 350/96.10
[58] Field of Search ............. 350/96.20, 96.21, 96.22
[56] References Cited
  U.S. PATENT DOCUMENTS
  4,273,413  6/1981  Bendiksen et al. ............ 250/227 X
  4,322,127  3/1982  Comerford et al. ............ 350/96.21
  4,327,964  5/1982  Haesly et al. .................. 350/96.20

FOREIGN PATENT DOCUMENTS
  0050735  4/1977  Japan ...................... 350/96.21

OTHER PUBLICATIONS

"Single Mode Fiber Connectors", Tsuchiya et al., The Electrical Communication Laboratories, vol. 27, Nos. 7-8, Jul. 1979.

Primary Examiner—William L. Sikes
Assistant Examiner—Akm E. Ullah
Attorney, Agent, or Firm—Sughrue, Mion, Zinn, Macpeak & Seas

[57]       ABSTRACT

First and second ferrules of an optical fiber connector assembly are provided with angled apertures proximate their contacting ends. The angled apertures have a common axis when the two ferrules are assembled together, and the single optical fibers within the apertures are ground together with the ferrule end surfaces so that they are flush therewith. Feedback light resulting from end reflection is reflected outwardly of the cable, i.e. leaked, owing to the angularity of the fiber end surface with respect to the axis thereof.

8 Claims, 10 Drawing Figures

OPTICAL FIBER CONNECTOR

BACKGROUND OF THE INVENTION

The present invention generally relates to a connector and, more specifically, to an optical fiber connector for coupling a pair of single optical fibers.

With the improvement of transmission loss in optical fibers, the Fresnel reflection caused on an optical fiber end surface in an optical fiber connector has been becoming a critical factor in the determination of the transmission quality of optical communication systems. More particularly, the feedback of reflected light to a laser diode makes the oscillation characteristics thereof unstable, and reflected light again returns to the light receiving element to deteriorate the S/N ratio.

In order to avoid Fresnel reflection, several arrangements have been attempted; (1) an index matching agent is inserted between end surfaces of two optical fibers; (2) the end surfaces of optical fibers are coated with a non-reflecting film (Jap. Utility Model Application Laid-open, 88217 (1981); and (3) either the end surfaces of the optical fibers or the end surfaces of the ferrule are inclined to make a reflection angle larger than the numerical aperture of optical fibers so as to leak light (refer to Jap. Patent Application Laid-open 149346 (1978) and 150142 (1979). The index matching agent and the non-reflection coating aim at reducing reflection per se while the slant configuration of the end surfaces has the intention of preventing propagation of reflected light.

The first means, however, lacks reliability, and is inconvenient in mating and/or disconnection. The second means is defective in that it is practically impossible to lower the refractive index of the coated films to less than 1%, and in that such coating might peel off when fibers are coupled in abutment. The third means is also disadvantageous in that end surfaces of the fibers must be bevelled accurately at a particular angle and, further, at the time of mating two fibers, and surfaces of each fiber should be accurately aligned anglewise.

SUMMARY OF THE INVENTION

The principal object of the present invention is to provide a novel optical fiber connector structure which can obviate problems heretofore encountered in the prior art.

An optical fiber connector assembly for coupling a pair of optical fibers in an aligned position, in accordance with the present invention, comprises: first and second ferrules each adapted to be fixed to an end of an optical fiber, each of the first and second ferrules being formed with a first aperture extending a certain distance, from a front flat end of the ferrule to a rear flat end of ferrule, along a slant axis having a predetermined angle with respect to the ferrule axis and having second aperture parallel to the ferrule axis and extending from the rear flat end of the ferrule, the first aperture being shaped and dimensioned to permit a stripped end of a single optical fiber to be positioned within the first aperture, the fiber being positioned so that the fiber end and the front end are coplanar; and a receptacle body guiding the first and second ferrules, the first and second ferrules being positioned within the receptacle body so that the front flat ends of the first and second ferrules contact each other and the axes of the stripped ends of the single optical fibers of the first and second ferrules are on a common axis.

According to the present invention, end surfaces of two ferrules are constructed perpendicular to the axes thereof, two fibers are arranged in a manner that the axes are inclined with respect to the ferrule axes, and the ferrule end surfaces are made to contact and the axes of the two fibers to form a straight line, thereby facilitating positional alignment of the ferrules and the grinding of the ends thereof as well as effectively preventing the feedback which is otherwise caused by Fresnel reflection.

DESCRIPTION OF THE PREFERRED EMBODIMENTS

Figure 1:
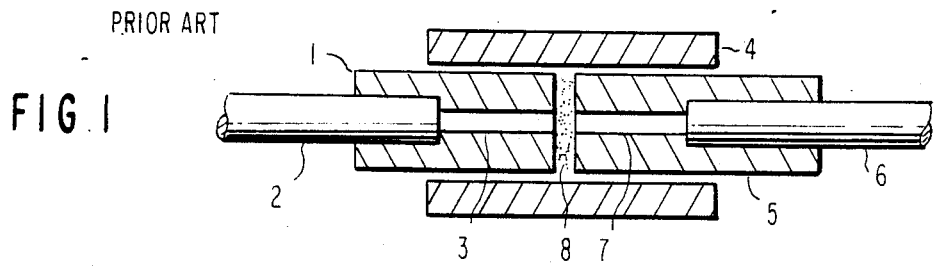
FIGS. 1 through 3 are schematic cross sectional views of prior art optical fiber connectors respectively.

In the prior art optical fiber connector shown in FIG. 1, fibers 3 and 7 which are stripped of claddings 2 and 6 are held by ferrules 1 and 5, and the ferrules 1 and 5 are inserted into a hole in a guide sleeve 4. An index matching agent 8 is filled in between the ferrules. In such a structure, dust easily becomes adhered at the time of mating/unmating, presenting difficulties in maintenance as it requires frequent cleansing and the additional feeding of an index matching agent. The structure lacks long term reliability as leakage and chemical changes of the agent might occur.

Figure 2:
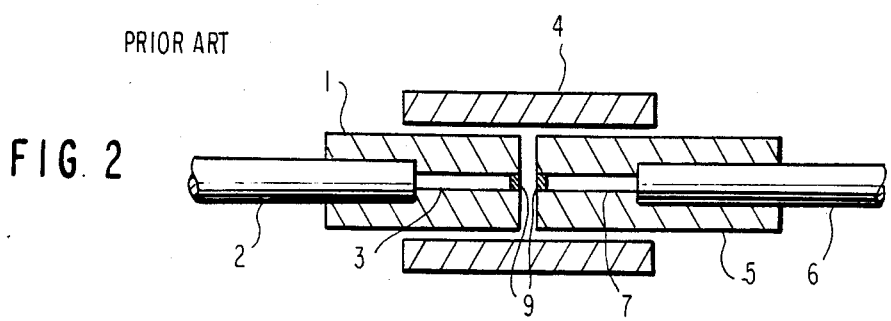

The second example of the prior art shown in FIG. 2 seeks to suppress reflection by coating the fiber ends with a non-reflection coating agent 9. Although the non-reflection coating agent 9 can theoretically prevent reflection, coating materials presently available can not reduce the refraction index to 1% or less. The coating might peel off when fibers are abutted for connection.

Figure 3:
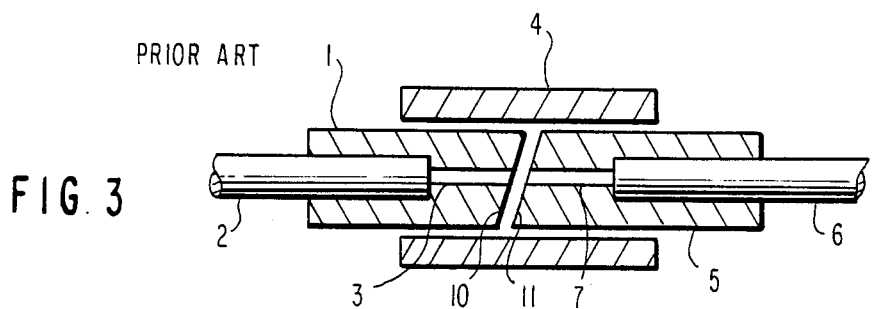

The third prior art device shown in FIG. 3 is structured in a manner such that the end surfaces 10 and 11 of the ferrules 1 and 5 and the optical fiber end surfaces are accurately bevelled so as to leak the light reflected from the fiber end surfaces. Although this device can leak reflected light, the angular alignment between a pair of ferrules or fibers is difficult and a slight misalignment which causes line contact, not surface contact, in engagement might damage the fiber end surfaces when the ferrules are frequently mated/unmated. This construction also requires special jigs and tools for in situ assembly.

Figure 4:
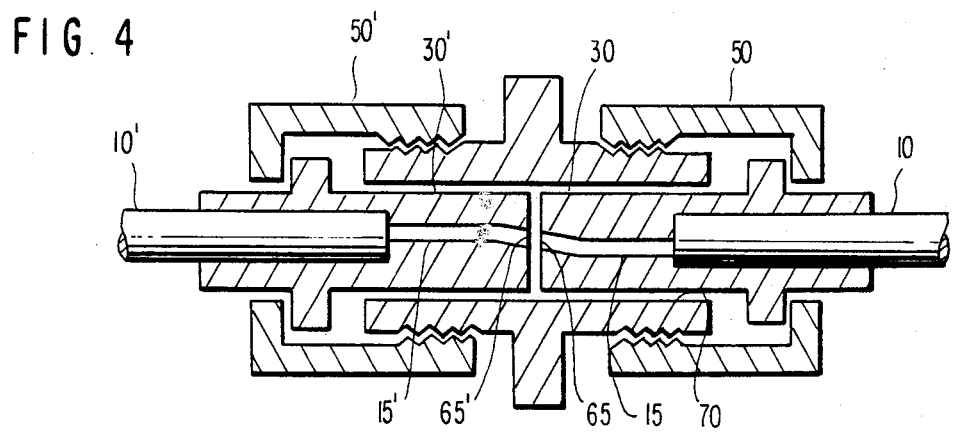
FIG. 4 is a schematic cross sectional view of the first embodiment of the present invention.
Figure 5:
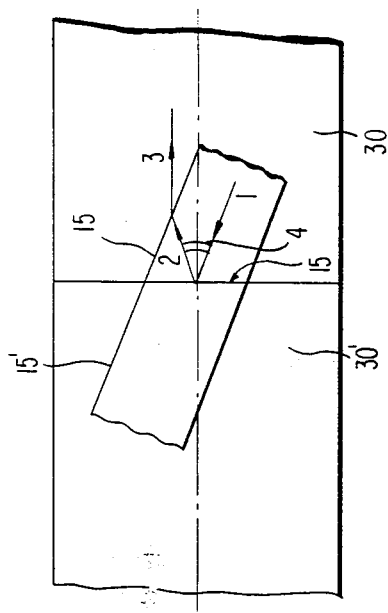
FIG. 5 is a cross section explaining the principle of the present invention.

In FIGS. 4 and 5, the first embodiment of the optical fiber connector according to this invention includes two ferrules 30, 30' which respectively hold optical fibers 15, 15' therein, and coupling nuts 50, 50' which fix two ferrules 30, 30' on a receptacle body 70. The ferrule 30 is formed with a first hole extending obliquely with respect to the ferrule axis from the center of an end surface 65 which is perpendicular to the ferrule axis. A second hole is bored parallel to the ferrule axis to communicate with the first hole. A third hole having a diameter larger than that of the second hole is further provided. Fiber tips from which the claddings have been stripped off are inserted into the bevelled hole from the opening of the third bore and are ground together with the ferrule end surfaces to form a coplanar surface perpendicular to the ferrule axis. Ferrule 30' has a similar construction, and is located in a position rotated from the ferrule 30 by 180°, so that the axes of the two fibers are arranged in a line, and the line forms a certain angle with respect to the ferrule axis when the two end surfaces 65, 65' of the two ferrules 30, 30' are snugly mated inside the receptacle body.

Referring now to FIG. 5, the light 1 which has passed through the fiber 15 is reflected on the fiber end surface 65. However, if the inclination of the fiber with respect to the ferrule axis is set so that the reflection angle 4 to the surface 65 is greater than the numerical aperture of the fiber, the reflected light will become leak light 3 and will not return to the inside of the fiber.

Referring back to FIG. 4, as the ferrule end surfaces and the fiber end surfaces are perpendicular to the ferrule axis, and as the fibers 15, 15' are fixed to the ferrules 30, 30', the end surfaces are easily finished by grinding and there is no problem in situ assembly. As the surface pressure exerted on the pair of ferrules 30, 30' to be connected is uniform, it will not damage the fibers. The interstitial space between the fibers is maintained constantly at zero or almost zero, thereby enabling a stable and secure connection.

Figure 6:
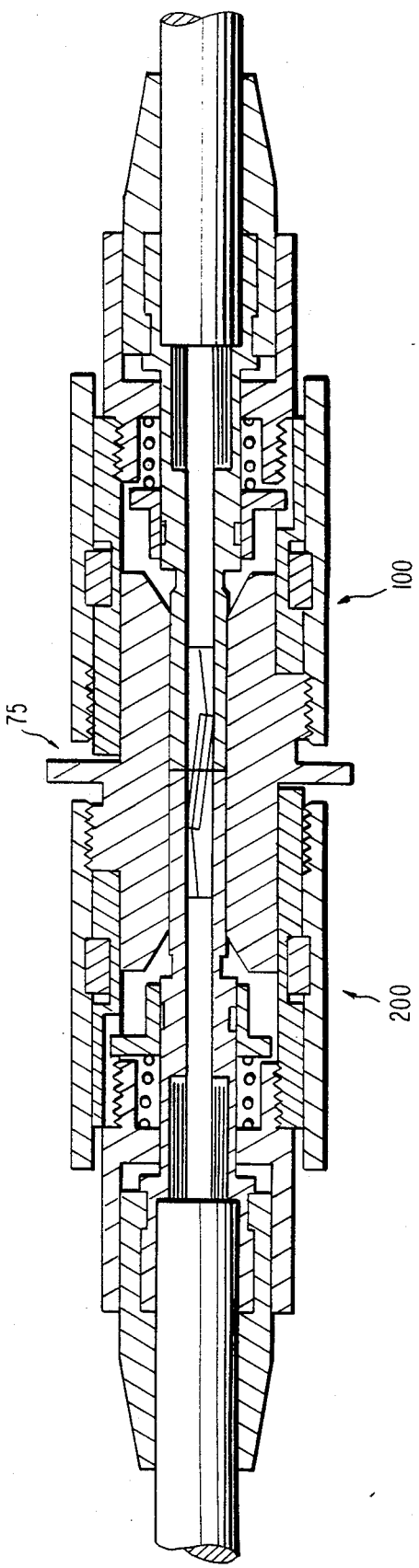
FIG. 6 is a cross sectional view of the second embodiment of optical fiber connector according to the present invention.

In FIG. 6, the optical connector embodying the present invention includes an adaptor 75, and a pair of plugs 100, 200 which are coupled from both sides to the adaptor.

Figure 7:
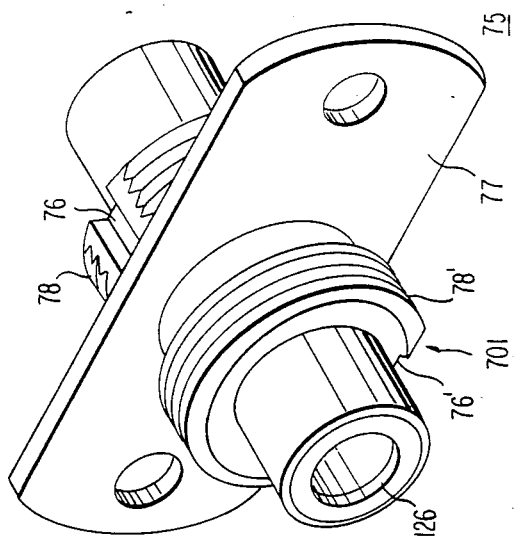
FIG. 7 is a perspective view of an adaptor to be used for the embodiment of FIG. 6.

As shown in FIG. 7, the adaptor 75 comprises a receptacle body 70 having an axial bore 126 of uniform inner diameter mounted on a flange 77 and external threaded portions 78, 78°. The threaded portions are positioned so that axial grooves 76, 76' which are parallel to the axial direction, become symmetrical to each other in respect of the point where the axis and the flange cross each other. The axial grooves are therefore provided in directions staggered by 180° from the outer periphery of the receptacle body.

Figure 8:
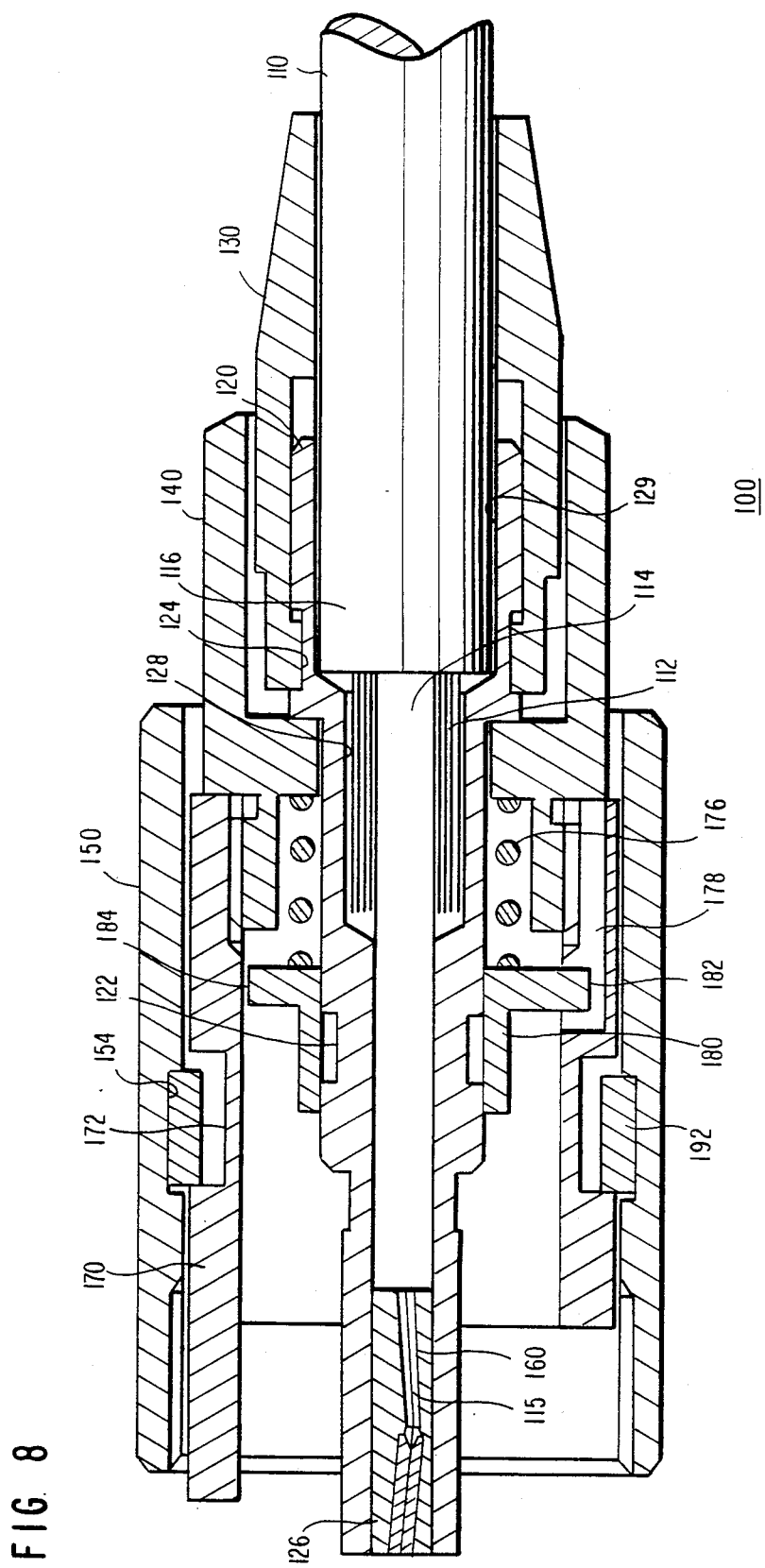
FIG. 8 is a cross sectional view of a plug to be used in the embodiment shown in FIG. 6.
Figure 9:
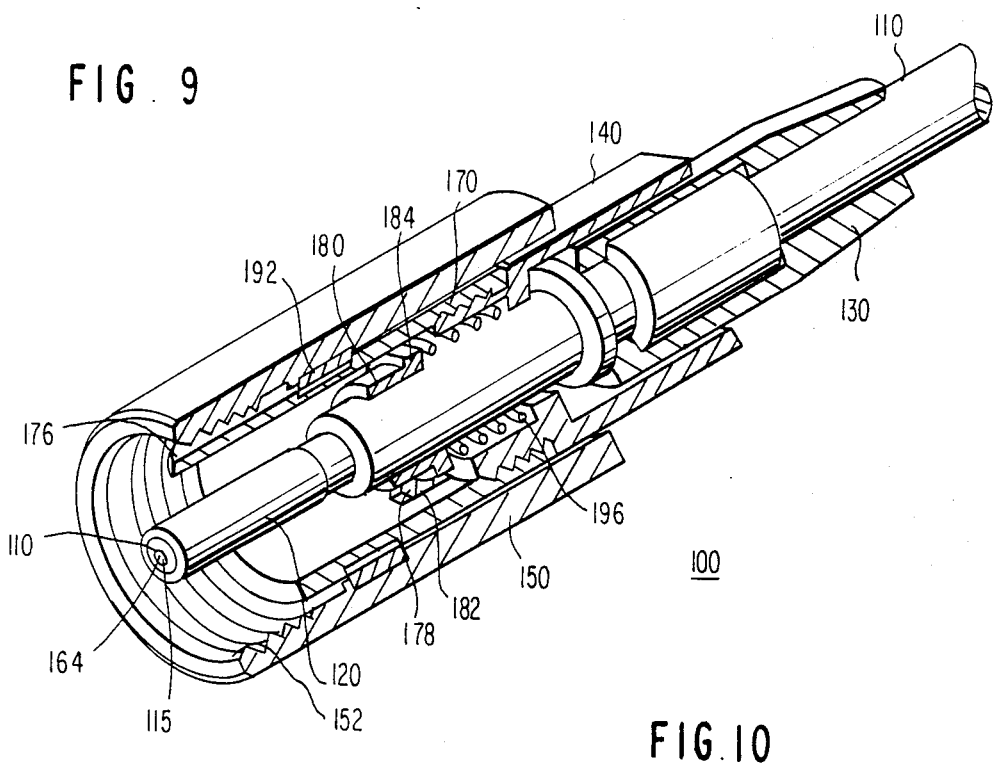
FIG. 9 is a partially exploded perspective view of the plug.

In FIGS. 8 and 9, a plug 100 includes a ferrule 120, a support body 170 for housing the ferrule, a stop nut 140 for fixing the ferrule on the support body and a coupling nut 150 to be coupled with the support body via a retainer 192 for connection with an adaptor. The optical fiber cable 110 comprises, from the core outward, a single optical fiber 115, a nylon cladding 114 which acts as a protective jacket for the single strand, a tensile strength member 112, and an outer sheath 116 which is made of polyvinyl chloride and acts as a reinforcing member.

The ferrule 120 is of a hollow cylindrical configuration comprising, from inside to axially outward, a first hollow axial bore 126, a second hollow axial bore 128 of a larger diameter than that of the first bore, and a third hollow axial bore 129 of a larger diameter than that of the second bore. The ferrule 120 forms, on the external side thereof from the tip end in the circumferential direction, a first annular groove 122 and a second annular groove 124. The ferrule includes a ring 180 which is fixed along the first annular groove 122. The ring 180 has a flange 184 a portion of which defines a projection 182. The first axial bore 126 of the ferrule includes a hollow cylindrical member 160 which determines the direction of the axis of a single fiber strand at the tip end thereof.

Figure 10:
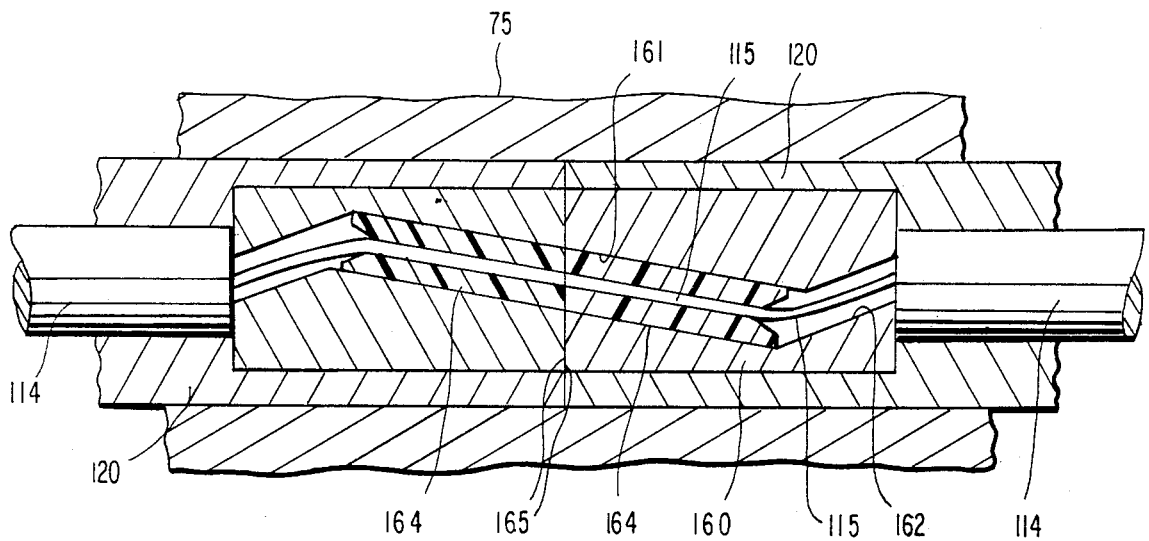
FIG. 10 is a cross sectional view showing the details of the coupling between the optical fibers.

Referring now to FIG. 10, the inside of the hollow cylindrical member 160 is formed with a first bevel bore 161 which has a uniform diameter and is inclined by 10° with respect to the center axis in a manner such that the tip end thereof is positioned at the center of the front end surface 165. A second bevel bore 162 extends from the center of the rear end to communicate with the first bevel bore. A capillary 161 of a diameter substantially identical to that of the first bevel bore is inserted from the front end of the hollow cylindrical member 160 and secured.

Referring to FIGS. 8 and 9 again, the optical fiber cable 110 is processed to expose the single optical fiber strand at the end section, the nylon cladding at the first intermediate section and the tension member at the second intermediate section. The optical fiber is inserted into the ferrule 120 so that respective sections are positioned at the cylindrical member 160 in the first axial bore 126, and the second and the third bore, respectively, and then are securely fixed. The optical fiber strand goes through the second bevel bore inside the cylindrical member 160 and reaches the capillary 164 which has an inner diameter substantially identical to that of the strand to be fixed therein with an adhesive agent. The fiber tip end, the ferrule end surface and the cylindrical member end surface are ground to form a coplanar surface perpendicular to the central axis of the ferrule. A projected member of a rubber holder 130 fixed on the fiber cable 110 is engaged within the second annular groove 124. The rubber holder acts as a buffer against bending of the cable.

The fiber thus assembled up to this stage is mounted with a stop nut 140 from the tip end of the ferrule, which is then covered by a coil spring 196 and a ring 180. The ring 180 is caulked to the ferrule on the first annular groove 122 in a manner such that the projection 182 of the flange 184 is aligned with the direction of the longer axis of an ellipse formed by the section of the bevel bore on the ferrule end surface.

The support body 170, which is hollow and cylindrical, has a hook 176 extending axially and a guide groove 178 which is staggered by 180° from the hook and is provided axially along the inner wall in the direction opposite to the hook. An annular groove 172 is further provided on the outer periphery. The ferrule with the ring is inserted along the inner wall of the support body 170 in a manner so as to cause the projection 182 to engage with the guide groove 178. While pressing the spring coil 196 with the stop nut 140, the stop nut is coupled with a threaded portion provided inside the support body. A retainer 192 having a resilient characteristic in the radial direction is pressed into the support body 170 for engagement. When a coupling nut 150 is placed over the support body with the retainer, the retainer is made to extend axially at the position of the internal annular groove 154 provided at the center of the axial bore inside the coupling nut so as to couple both members in a manner allowing the coupling nut to freely revolve with respect to the support body. The plug is made of such members and is assembled in such order as above-mentioned.

The plug thus assembled is coupled with a receptacle body 70 of an adaptor 75 as shown in FIG. 7. If the hook 176 of the support body 170 is positionally aligned to engage the axial groove 76 of the receptacle body, and if the coupling nut is revolved, the external thread 78 of the receptacle body mates with the internal thread 152 of the coupling nut, thereby advancing the ferrule in the axial direction.

As the plug 200 shown in FIG. 6 is identical in structure to the plug 100, a description thereof is omitted for simplification. Supposing respective components of the plug 200 are denoted by reference numerals identical to those in FIGS. 8 and 9, the plug 200 is coupled with the adaptor 75 (FIG. 5) as is explained below. When the hook 176 of the support body is engaged into the channel 76' of the receptacle body and the coupling nut is rotated, the internal threads of the coupling nut 150 mate with the external threads of the receptacle body so as to advance the ferrule in the axial direction until it comes to contact the end surface of the ferrule of the plug 100.

It is apparent that the axial direction of the fiber strands which extend across the two end surfaces of the ferrules forms a single straight line in the connector constructed by assembling two plugs on a receptacle body. Since the fiber end surface is inclined with respect to the axis thereof, the reflected component of the light entered into one of the fiber end surfaces deviates from the axis in reflection according to Snell's law. If the axis is arranged on the fiber end surface at a value larger than the numerical aperture of the fiber, then all of the reflected components are made to leak to the outside of the fiber, thereby eliminating that light which might otherwise be propagated through the fiber as feedback.

It is to be understood that the embodiments described hereinabove are merely illustrative of the principles of the invention. Various modifications thereto may be effected by persons skilled in the art without departing from the spirit or the scope of the invention. For example, the receptacle body may include a sleeve or a guiding means therein to arrange the ferrules.

What is claimed is:

1. An optical fiber connector assembly for assembling a pair of optical fibers in an aligned position, comprising:

first and second ferrules, each adapted to be fixed to the end of an optical fiber, each of said first and second ferrules being formed with (1) a first aperture extending a certain distance from a front flat end of said ferrule toward a rear end of said ferrule along a bevel axis inclined at a predetermined angle to a ferrule central axis and (2) a second aperture extending from said rear end of said ferrule; said first aperture being shaped and dimensioned so as to permit a stripped end of a single optical fiber to be positioned within said first aperture, the fiber being so positioned that the fiber end and said front flat end of said ferrule form coplanar surfaces whereby the planar surface of said fiber end forms an angle of less than 90° with respect to an axis of said fiber, which angle is equal to 90° minus said predetermined angle; and a receptacle body guiding said first and second ferrules, said first and second ferrules being positioned within said receptacle body so that said front flat ends of said first and second ferrules contact each other and axes of said stripped ends of said single optical fibers of said first and second ferrules are on a common axis.

2. An assembly as claimed in claim 1, wherein said second aperture is parallel to said ferrule central axis.

3. An assembly as claimed in claim 1, wherein said second aperture is disposed at an angle with respect to said ferrule central axis.

4. An assembly as claimed in claim 1, wherein the end surfaces of said fibers are arranged at such an angle with respect to the axes thereof that light reflected from said end surfaces is made to leak from said fibers.

5. An assembly as claimed in claim 1, said receptacle body including means for urging said ferrules into contact, and means for rotationally aligning said ferrules with respect to one another.

6. An assembly as claimed in claim 5, further including means for effecting threaded advancement of said ferrules with respect to said receptacle body.

7. An assembly as claimed in claim 5, said receptacle body including a threaded adaptor, and a pair of plug bodies engageable with said adaptor and housing said ferrules.

8. An assembly as claimed in claim 1, said fiber end and said flat front ferrule end being simultaneously ground to form said coplanar surfaces.

* * * * *

UNITED STATES PATENT AND TRADEMARK OFFICE
CERTIFICATE OF CORRECTION

PATENT NO. : 4,615,581

DATED : October 7, 1986

INVENTOR(S) : YOSHITAKA MORIMOTO

It is certified that error appears in the above-identified patent and that said Letters Patent is hereby corrected as shown below:

Column 4, line 62, delete "axially" insert --radially--.

Signed and Sealed this

Fourteenth Day of April, 1987

Attest:

DONALD J. QUIGG

*Attesting Officer*     *Commissioner of Patents and Trademarks*